United States Patent
Takahashi

Patent Number: 6,092,354
Date of Patent: Jul. 25, 2000

[54] DEVICE FOR FORMING PERFORATION FOR SEPARATION

[75] Inventor: Yoshimori Takahashi, Niigata, Japan

[73] Assignee: Nippon Seiki Co., Ltd., Niigata, Japan

[21] Appl. No.: 09/297,172

[22] PCT Filed: Aug. 28, 1998

[86] PCT No.: PCT/JP98/03870

§ 371 Date: Apr. 27, 1999

§ 102(e) Date: Apr. 27, 1999

[87] PCT Pub. No.: WO99/11439

PCT Pub. Date: Mar. 11, 1999

[30] Foreign Application Priority Data

Sep. 4, 1997 [JP] Japan ..................................... 9-239913

[51] Int. Cl.[7] .................................................. B65B 9/00
[52] U.S. Cl. ............................ 53/546; 53/389.3; 83/504; 83/659
[58] Field of Search .................... 53/202, 389.3, 53/546; 83/504, 654

[56] References Cited

U.S. PATENT DOCUMENTS

| | | |
|---|---|---|
| 1,661,619 | 3/1928 | Paddack . |
| 3,237,369 | 3/1966 | Stroop . |
| 3,677,122 | 7/1972 | Rautine . |
| 4,437,373 | 3/1984 | Van Der Meulen . |
| 4,684,360 | 8/1987 | Tokuno et al. . |
| 4,885,964 | 12/1989 | Nielsen et al. . |
| 4,989,487 | 2/1991 | Staley . |
| 5,297,461 | 3/1994 | Hirakawa et al. . |

FOREIGN PATENT DOCUMENTS

| | | |
|---|---|---|
| 44-8709 | 4/1969 | Japan . |
| 50-10284 | 4/1975 | Japan . |
| 51-21195 | 6/1976 | Japan . |
| 5-36285 | 5/1993 | Japan . |
| 5-43570 | 7/1993 | Japan . |
| 6-62134 | 8/1994 | Japan . |
| 6-4440 | 11/1994 | Japan . |

*Primary Examiner*—Daniel B. Moon
*Attorney, Agent, or Firm*—McDermott, Will & Emery

[57] ABSTRACT

A perforated separation line forming apparatus which is characterized by: an edged rotary body (2) having a round slitting edge (1); and a receiving rotary body (4) having a receiving circumferential surface (3) that the round slitting edge engages; wherein the edged rotary body (2) and the receiving rotary body (4) are arranged to clamp a perforated line forming position (6) of a continuously fed transfer material (5) therebetween; wherein the receiving circumferential surface (3) of the receiving rotary body (4) is formed with non-slit portion forming recesses (7), which the round slitting edge (1) of the edged rotary body (2) cannot engage, at predetermined intervals in the direction of rotation, so that the perforated separation line (8) formed at the perforated line forming position (6) has slit portions (8A) and non-slit portions (8B) alternated successively; wherein the receiving rotary body (4) is movably adjustable relative to the edged rotary body (2) in an axial direction, the non-slit portion forming recesses (7) of the receiving rotary body (4) are so shaped that a circumferential width of the recesses (7) in the direction of rotation changes in an axial direction of the receiving rotary body (4), and as a result of the relative movement of the receiving rotary body (4) in the axial direction, the circumferential width of the non-slit portion forming recesses (7) in the direction of rotation varies so that a ratio between the slit portions (8A) and the non-slit potions (8B) is variably adjustable.

3 Claims, 6 Drawing Sheets

DEVICE FOR FORMING PERFORATION
FOR SEPARATION

TECHNICAL FIELD

The present invention relates to a perforated separation line forming apparatus for automatically forming a perforated separation line having slit portions and non-slit portions alternated successively.

BACKGROUND OF THE INVENTION

As disclosed in official gazettes published by the Japanese Patent Office, including JP-B-50-10284U, JP-B-5-36285 and JP-B-6-62134, a conventional filling and packaging machine for automatically filling and packing a material to be packed, such as liquid, powder and viscous material, is known to perform the steps of folding a continuously fed film, overlapping both edges of the folded film, longitudinally sealing the overlapped edges, filling a material to be packed into the longitudinally sealed film, laterally sealing the film, cutting a central part of the laterally sealed portions by a cutting mechanism to separate the film into individual packages, and delivering them out of the machine.

Such a filling and packaging machine is often constructed to form a longitudinal seal also at a central part of the film so that package bags containing a filled material are parallelly disposed side by side as they are delivered from the machine, and the machine often has a perforated line forming apparatus for forming a perforated separation line at the longitudinally sealed portion that constitutes a border between the left and right parallelly disposed package bags loaded with a material.

The conventional perforated separation line forming apparatus that forms a perforated line at a predetermined position on a transfer material (connected package bags), as described above, includes an edged rotary body (edged disk) simply having a round slitting edge and a receiving rotary body (receiving roller) having a receiving circumferential surface that the round slitting edge engages, with the transfer material held between these rotary bodies. The conventional perforated separation line forming apparatus has formed, in the receiving circumferential surface of the receiving rotary body, recesses (grooves) of a predetermined circumferential width for making non-slit portions at predetermined intervals in the direction of rotation.

That is, as the transfer material is fed, both of these rotating bodies rotate and the round slitting edge presses against the receiving circumferential surface to cut under pressure the transfer material at a predetermined position, while at the recesses the round slitting edge does not press against the receiving circumferential surface, so the transfer material is not by pressing.

Because the recesses are formed in the receiving circumferential surface at predetermined intervals, circumferential widths of the recesses constitute the non-slit portions and circumferential distances between the recesses on the receiving circumferential surface constitute the slit portions. These non-slit portions and slit portions together form a perforated separation line.

In the example case where a perforated line is formed in a longitudinally sealed portion at the boundary between the left and right package bags, however, when the hardness or thickness of the longitudinally sealed portion changes as a result of a change made in the material or thickness of the film, for example, it will become more difficult or easier to separate the left and right package bags if the same perforated line is formed at all times.

That is, when the longitudinally sealed portion is hard and not easily cut, it is desired that the ratio of the slit portion to the non-slit portion be increased to make it easier to separate the longitudinally sealed portion.

Conversely, when the longitudinally sealed portion is thin and easily cut, it is desired that the ratio of the slit portion to the non-slit portion be reduced to adjust and lower the level of ease with which the longitudinally sealed portion can be separated.

In the conventional apparatus, however, to make such an adjustment on the slit ratio of the perforated line, it is necessary to prepare a plurality of receiving rolling bodies with different circumferential widths or formation pitches of the non-slit portion forming recesses and to replace the receiving rolling body. This replacement work is not only troublesome but very costly because different receiving rolling bodies must be used. This is not practical. Further, even when such a replacement is made, the replacement choice is limited to a fixed number of receiving rolling bodies separately prepared for replacement.

Hence, under the present situation, there is no alternative but to form a perforated line with a fixed ratio between the slit portion and the non-slit portion at all times (i.e., the slit ratio of the perforated line cannot be adjusted as required). This gives rise to a problem that, in the filling and packaging machine as described above, the level of ease with which the perforations can be separated may change as a result of a change made in the material or the like of the film.

The invention has addressed and solved these problems experienced with the conventional perforated separation line forming apparatus, and it is an object of the invention to provide a novel perforated separation line forming apparatus which is very practical and capable of quickly adjusting the ease with which the perforated separation line can be separated, with simple operations and little additional cost.

DISCLOSURE OF THE INVENTION

According to the invention there is provided a perforated separation line forming apparatus according to claim 1 which is characterized by: an edged rotary body 2 having a round slitting edge 1; and a receiving rotary body 4 having a receiving circumferential surface 3 that the round slitting edge 1 engages; wherein the edged rotary body 2 and the receiving rotary body 4 are arranged to clamp a perforated line forming position 6 of a continuously fed transfer material 5 therebetween; wherein the receiving circumferential surface 3 of the receiving rotary body 4 is formed with non-slit portion forming recesses 7, which the round slitting edge 1 of the edged rotary body 2 cannot engage, at predetermined intervals in the direction of rotation, so that the perforated separation line 8 formed at the perforated line forming position 6 has slit portions 8A and non-slit portions 8B alternated successively; wherein the receiving rotary body 4 is movably adjustable relative to the edged rotary body 2 in an axial direction, the non-slit portion forming recesses 7 of the receiving rotary body 4 are set to have a shape such that a circumferential width of the recesses 7 in the direction of rotation changes in an axial direction of the receiving rotary body 4, and as a result of the relative movement of the receiving rotary body 4 in the axial direction, the circumferential width of the non-slit portion forming recesses 7 in the direction of rotation varies so that a ratio between the slit portions 8A and the non-slit potions 8B is variably adjustable.

Further, according to another aspect of the invention, there is provided a perforated separation line forming apparatus, wherein the non-slit portion forming recesses 7 of the receiving rotary body 4 are so shaped that the circumferential width of the recesses 7 in the direction of rotation progressively increases or decreases in an axial direction of the receiving rotary body 4, and as a result of the relative movement of the receiving rotary body 4 in the axial direction, the circumferential width of the non-slit portion forming recesses 7 in the direction of rotation varies so that a ratio between the slit portions 8A and the non-slit portions 8B is variably adjustable in a predetermined adjustment range.

Further, in a filling and packaging machine which longitudinally and laterally seals a continuously fed film F while at the same time filling a content 9 into the film F to produce a plurality of columns, parallelly arranged side by side, of package bags 5 loaded with the content 9, each column having a number of package bags 5 connected in series; according to still another aspect of the invention there is provided a perforated separation line forming apparatus according to claim 1 claim 2, wherein the edged rotary body 2 and the receiving rotary body 4 are arranged so that the perforated separation line 8 can be formed in longitudinally sealed portions 6 that constitute boundaries between the columns, parallelly arranged side by side, of the package bags 6 loaded with the content 9.

A preferred embodiment of the invention (showing how the invention is embodied) will be briefly explained in terms of its workings and effects by referring to the drawings.

As the transfer material 5 is continuously fed, the edged rotary body 2 and the receiving rotary body 4, both disposed to clamp a predetermined position of the transfer material, rotate.

A round slitting edge 1 of the edged rotary body 2 engages a receiving circumferential surface 3 of the receiving rotary body 4 to cut under pressure the predetermined position of the transfer material 5 to form slit portions 8A of a perforated separation line 8.

The receiving circumferential surface 3 of the receiving rotary body 4 are formed with non-slit portion forming recesses 7 at predetermined intervals in the direction of rotation. Because at these recesses 7 the round slitting edge 1 does not engage the receiving circumferential surface 3, the transfer material 5 is not cut by pressing, thus forming non-slit portions 8B.

Hence, the perforated separation line 8 is automatically formed which has the slit portions 8A and the non-slit portions 8B alternated, the slit portions 8A having a circumferential length corresponding to the formation pitch of the recesses 7 in the direction of rotation, the non-slit portions 8B having a circumferential length corresponding to the circumferential width of the recesses 7 in the direction of rotation.

In the invention, the recesses 7 are formed in a shape such that the circumferential width of the recesses 7 in the direction of rotation varies along the axial direction of the receiving rotary body 4.

Thus, moving or adjusting the receiving rotary body 4 in the axial direction relative to the edged rotary body 2, for example, allows the circumferential width of the non-slit portion forming recesses 7 in the direction of rotation to be varied for adjustment and also the formation pitch of the non-slit portion forming recesses 7 in the direction of rotation to be changed for adjustment.

In the invention therefore, by simply moving or adjusting the receiving rotary body 4 relative to the edged rotary body 2, the ratio between the slit portions 8A and the non-slit portions 8B can be adjusted to change the slit ratio of the perforated separation line 8 easily and without little additional cost.

BEST MODE FOR CARRYING OUT THE INVENTION

An example embodiment of the present invention will be described by referring to the accompanying drawings.

Figure 1:
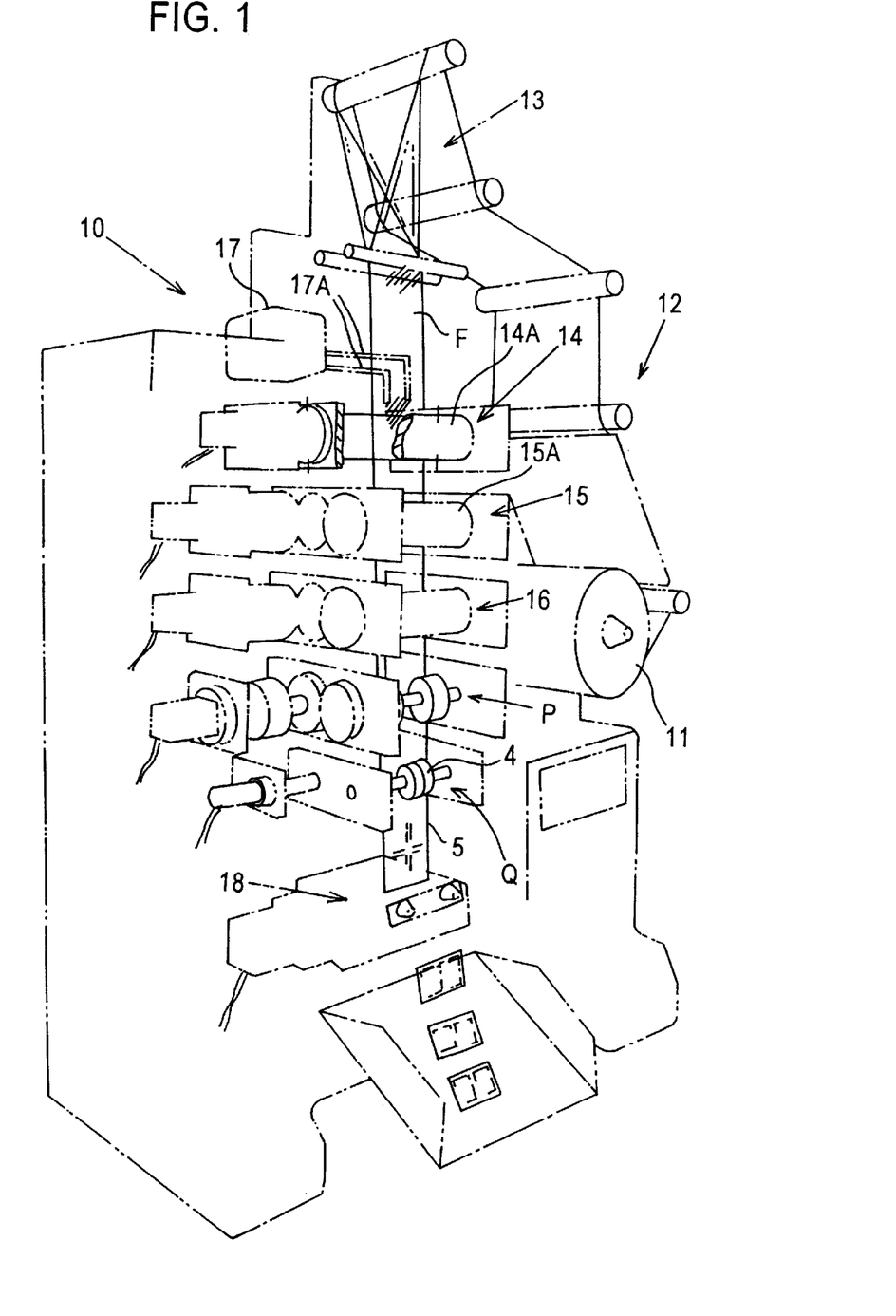
FIG. 1 is an explanatory outline perspective view of a filling and packaging machine according to one embodiment of this invention.
Figure 2A:
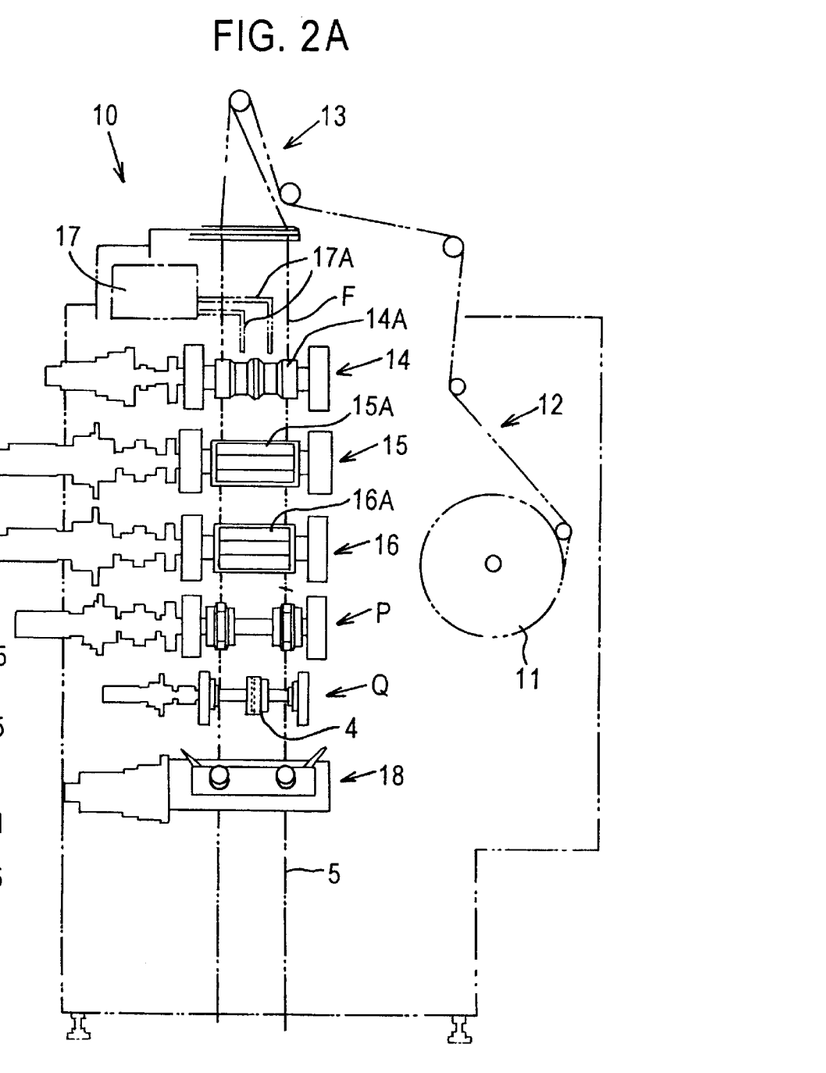
FIGS. 2A and 2B show an explanatory outline front view of the filling and packaging machine according to the embodiment.
Figure 2B:
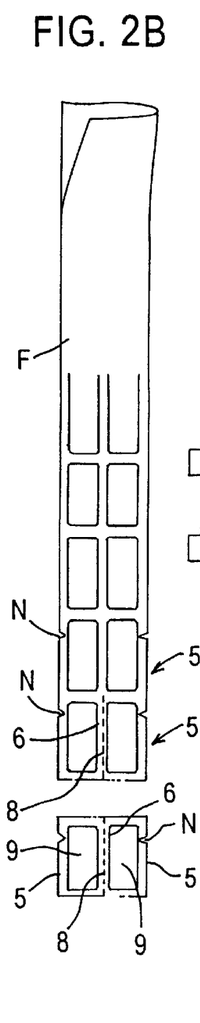

In this embodiment, the invention is applied to a perforated separation line forming apparatus which is installed in a filling and packaging machine as shown in FIG. 1 and FIG. 2 and which automatically forms a perforated separation line 8 in a central longitudinally sealed portion 6 (perforated line forming position 6) of package bags 5 (transfer material 5) with a content 9 loaded therein, which are carried successively through the machine with two columns of package bags parallelly disposed side by side and with package bags of each column longitudinally connected in series.

As shown in FIGS. 1 and 2, a film roll 11 of a film F wound in a roll is removably mounted at a side portion of a machine body 10. The film F drawn out of this film roll 11 is given a predetermined tension as it passes through a film guide mechanism 12, and is then pulled upward to a film folding mechanism 13 disposed at the upper part of the machine body 10 where the film is folded in two along its length and from which the folded film is drawn downward and guided.

In this embodiment, the film F folded in two and drawn downward is longitudinally heat-sealed at a folded edge portion, an intermediate portion and an opposite edge portion (at left and right edge portions and an intermediate portion) by a pair of longitudinal heat seal rollers 14A of a longitudinally sealing mechanism 14. Then, a first laterally sealing mechanism 15 and a second laterally sealing mechanism 16, both disposed below the longitudinally sealing mechanism 14, laterally heat-seal the folded film. In this case, first, a pair of lateral heat seal rollers 15A of the first laterally sealing mechanism 15 laterally heat-seal the folded film at predetermined intervals. The laterally sealed portions each form bottoms of bottomed cylinders, which will make two left and right parallelly disposed package bags. The content 9 is supplied onto the bottoms from filling nozzles 17A of a filling mechanism 17. Then, after the film F is fed, the lateral heat seal rollers 15A of the first laterally sealing mechanism 15 seal bag inlet portions of the film F to form the package bags 5 loaded with the content 9. These laterally heat-sealed portions are laterally heat-sealed again by the lateral heat seal rollers 16A of the second laterally sealing mechanism 16, after which the package bags 5 loaded with the content 9 are successively carried downward, with two columns of the package bags parallelly disposed side by side and each column having a number of the package bags longitudinally connected in series.

In the embodiment the first laterally sealing mechanism 15 and the second laterally sealing mechanism 16 are arranged in two stages below the longitudinally sealing mechanism 14, as described above. Also disposed below and to the left and right of the laterally sealing mechanisms 15, 16 are seal opening notch forming apparatuses P that make notches N in each of the longitudinally sealed portions on both edge sides. Further, disposed below and at the central part of the seal opening notch forming apparatuses P is a perforated separation line forming apparatus Q which forms a perforated separation line 8 in the central longitudinally sealed portion 6 between the left and right parallelly disposed bags 5. Further, below the perforated separation line forming apparatus Q is disposed a cutting mechanism 18 that successively cuts the laterally sealed portions of the package bags 5 that connect the bags longitudinally in series. The cutting mechanism 18 then delivers package bags 5 loaded with the content 9 that are laterally connected with each other through the perforated separation line 8.

That is, in the embodiment, the perforated separation line 8 is automatically formed continuously in the central longitudinally sealed portion 6 between the two columns of the package bags 5 by the perforated separation line forming apparatus Q as a result of the rotation of the edged rotary body 2 and the receiving rotary body 4, both opposing each other, as the film is drawn out and transferred (continuous transfer of the package bags 5).

Figure 3:
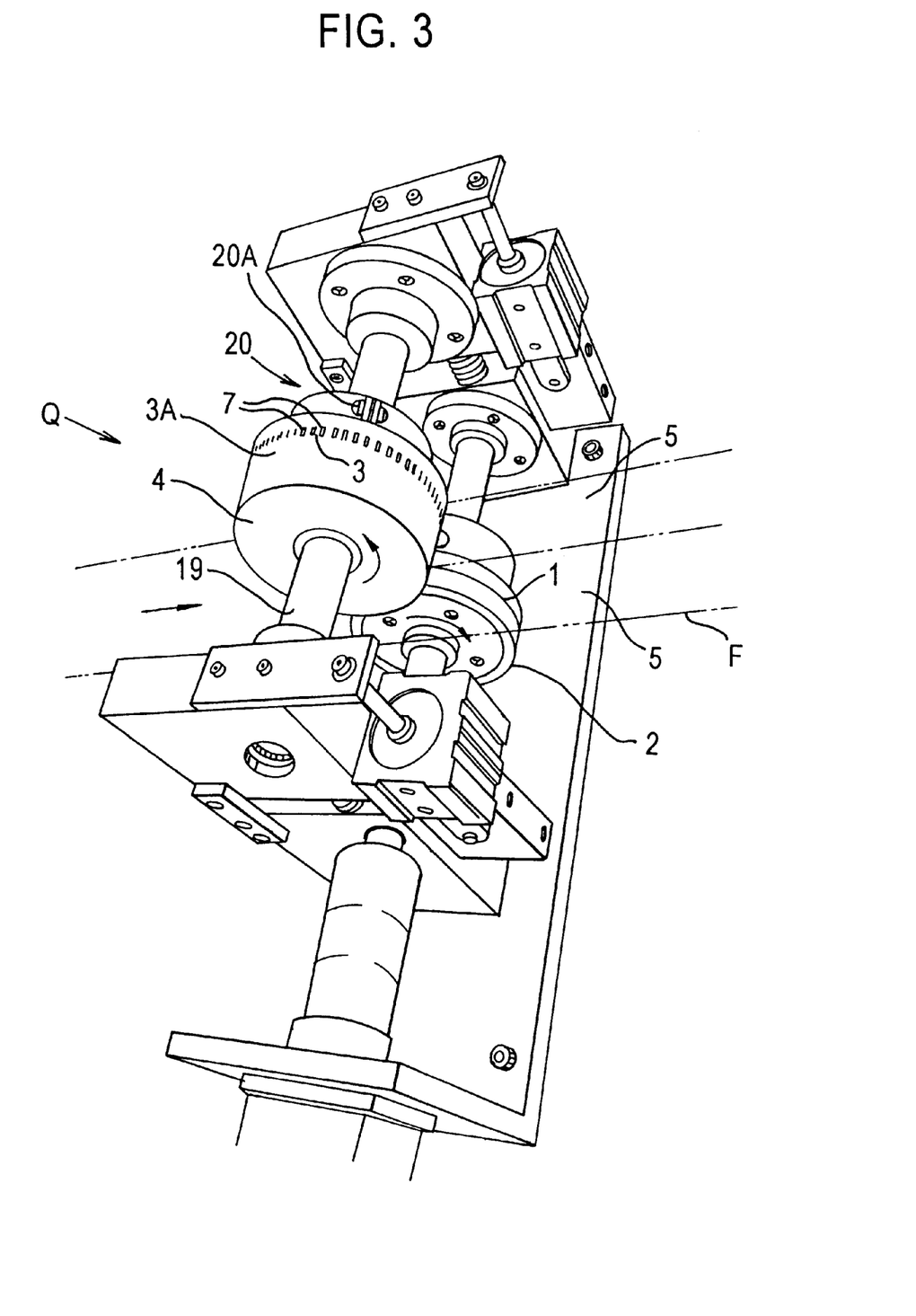
FIG. 3 is an explanatory perspective view of an essential portion of the embodiment.
Figure 4:
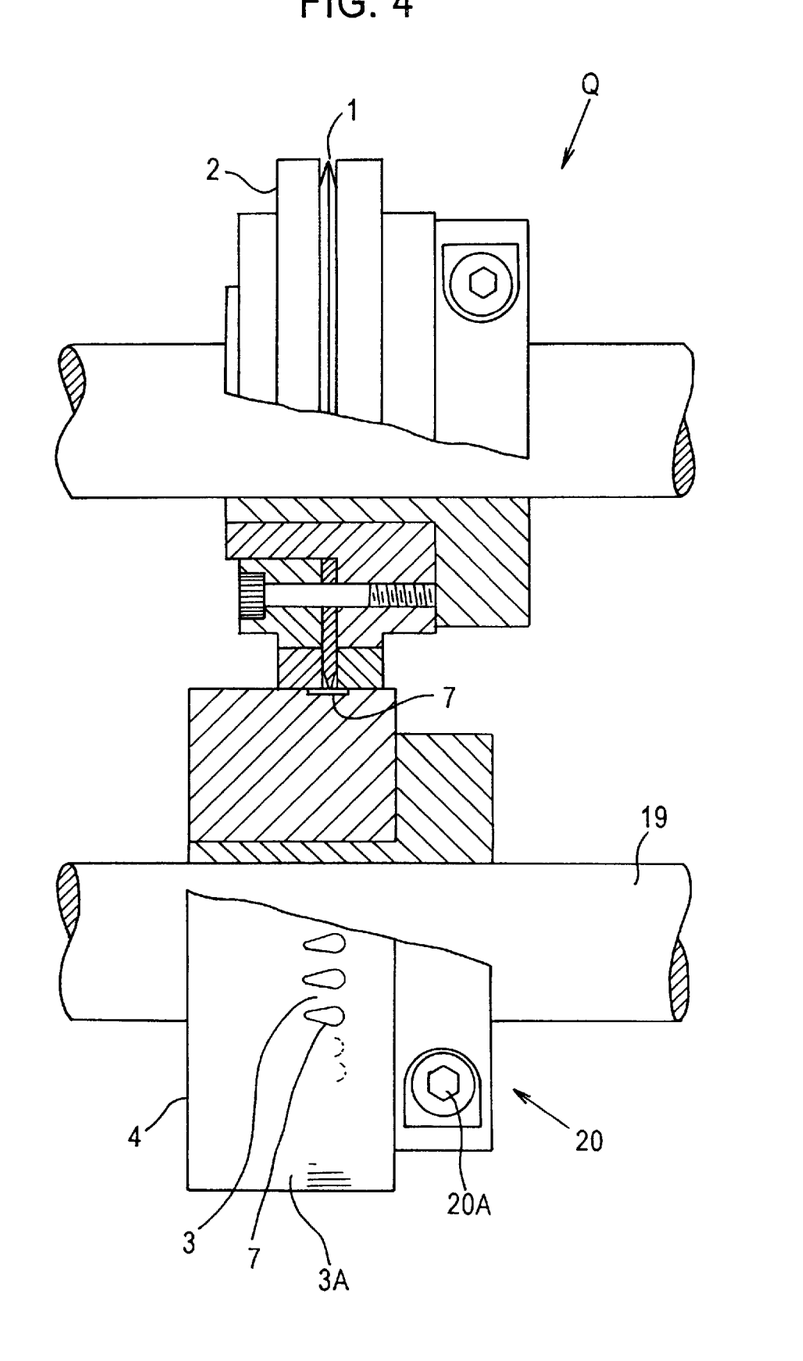
FIG. 4 is an explanatory plan cross-sectional view of the essential portion of the embodiment.
Figure 5A:
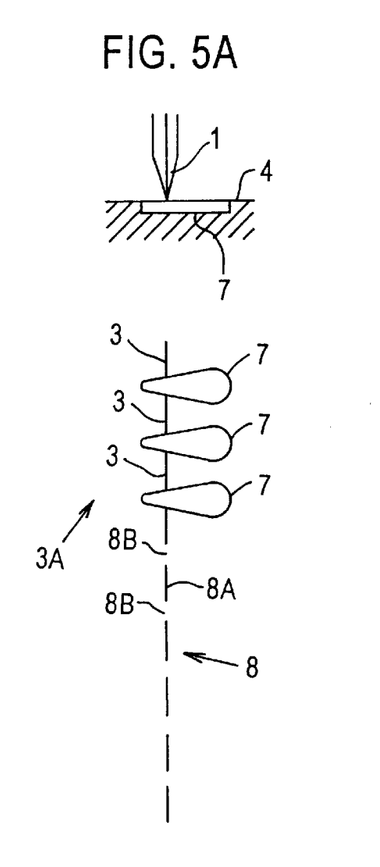
FIGS. 5A and 5B are explanatory diagrams showing how the slit ratio of the perforated separation line is adjusted (i.e., adjustment of the ratio between the slit portion and the non-slit portion) according to the embodiment.
Figure 5B:
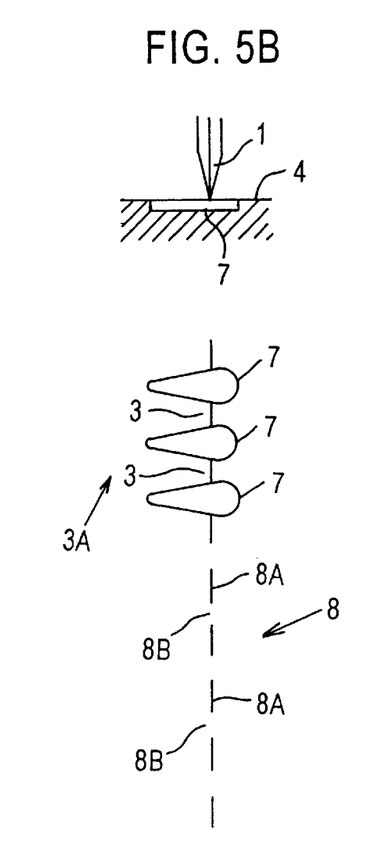

The perforated separation line forming apparatus Q for forming a perforated separation line 8 according to the embodiment of this invention will be described in detail with reference to FIGS. 3 to 5.

The edged rotary body 2 having a round slitting edge 1 along its entire circumference and the receiving rotary body 4 having a receiving circumferential surface 3 which the round slitting edge 1 engages are arranged to clamp the central longitudinally sealed portion 6 that constitutes the perforated line forming position 6.

The receiving circumferential surface 3 of the receiving rotary body 4 is formed with the recesses 7 for making the non-slit portions at predetermined intervals in the direction of rotation, the recesses constituting those portions which the round slitting edge 1 of the edged rotary body 2 cannot engage. This arrangement automatically forms at the perforated line forming position 6 the perforated separation line 8 having slit portions 8A and non-slit portions 8B alternated successively.

Further, in the embodiment, the receiving rotary body 4 can be moved for adjustment in the direction of rotating axis with respect to the edged rotary body 2. In more concrete terms, the receiving rotary body 4 can be moved along a rotating shaft 19, which rotatably supports the receiving rotary body 4, and be securely fastened at a desired position by a fastening mechanism 20.

Hence, in the embodiment, a fastening bolt 20A of the fastening mechanism 20 is loosened and the receiving rotary body 4 is moved a desired distance along the rotating shaft 19, after which the fastening bolt 20A is fastened again to fix the receiving rotary body 4. It is also possible to use the similar construction for the edged rotary body 2 and move the edged rotary body 2 for adjustment so that the receiving rotary body 4 is relatively moved for adjustment.

Further, in the embodiment, the non-slit portion forming recesses 7 of the receiving rotary body 4 are so shaped that their circumferential width in the direction of rotation varies according to the position in the axial direction of the receiving rotary body 4. In more concrete terms, the recesses 7 as grooves are formed in the shape of water droplet, triangle or oval, so that the circumferential width of the recesses 7 in the direction of rotation gradually increases or decreases in the axial direction of the receiving rotary body 4.

Therefore, according to the relative axial displacement of the receiving rotary body 4 with respect to the edged rotary body 2, the circumferential width of the non-slit portion forming recesses 7 in the direction of rotation can be varied to continuously change or adjust the ratio between the slit portions 8A and the non-slit portions 8B in a predetermined adjustment range.

Further, in the embodiment, on the circumferential surface of the receiving rotary body 4 on an axial direction side toward which the circumferential width of the non-slit portion forming recesses 7 decreases, there is provided a cutting edge receiving surface 3A for complete separation which has no non-slit portion forming recesses 7 formed therein in the direction of rotation.

Hence, as the receiving rotary body 4 is moved in the axial direction for adjustment as described above, the circumferential width of the non-slit portion forming recesses 7 through which the round slitting edge 1 of the edged rotary body 2 passes progressively increases or, when the receiving rotary body 4 is moved in the opposite direction, progressively decreases.

Thus, when the circumferential width of the recesses 7 decreases for example, the circumferential distance between them (between the recesses 7) increases, thus continuously changing or adjusting the perforated separation line 8 into the one with increasing slit portions 8A and decreasing non-slit portions 8B.

In this way, simply moving or adjusting the receiving rotary body 4 with respect to the edged rotary body 2 enables the adjustment of the slit ratio of the perforated separation line 8. Further, the embodiment can gradually increase or reduce the ratio of the slit portions 8A and the non-slit portions 8B according to the relative continuous displacement of the receiving rotary body 4 with respect to the edged rotary body 2.

The increase or decrease in the slit ratio of the perforated separation line 8 according to the relative displacement can of course be modified as desired by changing the shape of the recesses 7.

In this way, the embodiment allows the slit ratio of the perforated separation line 8 to be adjusted easily and without additional cost by simply making an improvement in which the circumferential width of the non-slit portion forming recesses 7 varies along the axial direction. For increasing or reducing the slit ratio according to the displacement of the receiving rotary body 4, the shape and formation pitch of the recesses 7 need only to be designed.

Further, in the embodiment, the circumferential width of the recesses 7 in the direction of rotation progressively becomes smaller toward one axial side of the rotating shaft 19. On this axial side, the circumferential surface of the receiving rotary body 4 is provided with a portion whose entire circumferential surface is the receiving circumferential surface 3, i.e., a cutting edge receiving surface 3A where no recesses 7 are formed in the direction of rotation.

Thus, when it is desired that the package bags are completely cut and separated without forming the perforated separation line 8, the receiving rotary body 4 needs only to be moved relatively so that the round slitting edge 1 of the edged rotary body 2 engages the cutting edge receiving surface 3A, as described above.

The embodiment therefore can easily switch between forming the perforated separation line 8 and completely cutting and separating the bags. Further, the embodiment allows the ratio of the non-slit portions 8B to the slit portions 8A to be progressively reduced to increase the slit ratio so that the perforations can easily be split apart. In addition, by moving the receiving rotary body 4 further, adjustment can be made until the bags are completely cut and separated.

Because the slit ratio can easily be adjusted in this way, it is possible to provide a novel filling and packaging machine, such as the one according to this embodiment, that can adjust the slit ratio according to the requirements of the user and which can also change the slit ratio as required according to a change as in the material of the film and the like.

Figure 6A:
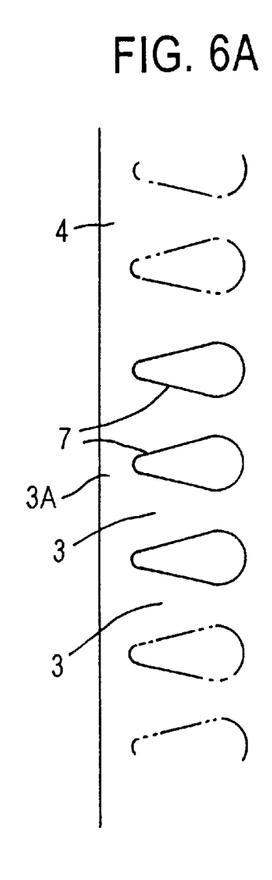
FIGS. 6A and B show explanatory diagrams showing various examples of recesses for the non-slit portions according to the embodiment.
Figure 6B:
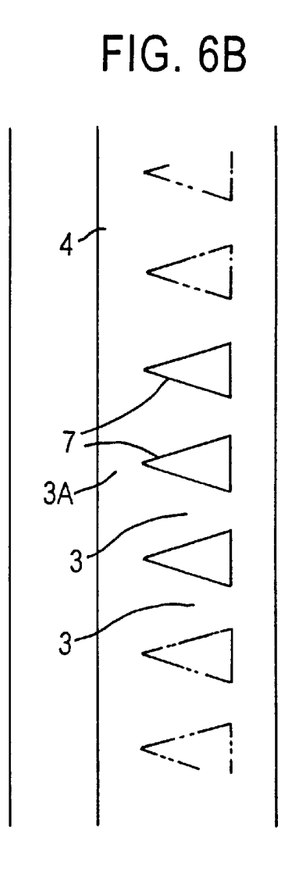

Although in the embodiment the non-slit portion forming recesses 7 are shaped like droplets, as shown in FIG. 6A, in which the circumferential width in the direction of rotation gradually change in the axial direction of the receiving rotary body 4, they may be formed in an almost triangular shape with a pointed tip as shown in FIG. 6B in which their circumferential width in the direction of rotation progressively decreases from a predetermined width to almost zero in the axial direction so that the ratio between the slit portions 8A and the non-slit portions 8B can be changed continuously to nearly zero. It is also possible to move the receiving rotary body 4 in the axial direction until the cutting edge receiving surface 3A is reached, thus allowing a nearly continuous switch from the perforated line to the complete cutting.

Figure 6C:
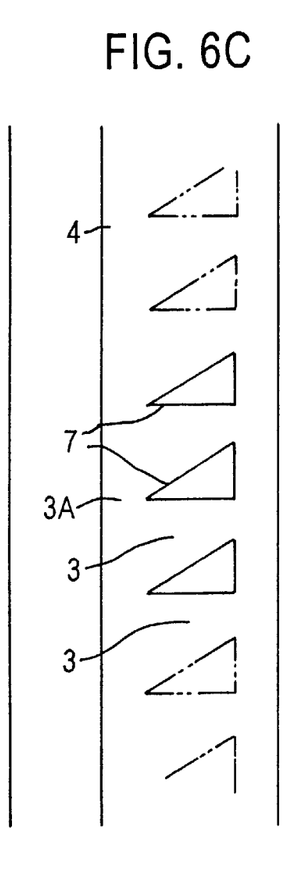

Further, another shape may be adopted as shown in FIG. 6C, in which both edges of the non-slit portion forming recesses 7 when viewed in the direction of rotation do not incline but only one edge does. This configuration produces the similar effects and workings.

Figure 6D:
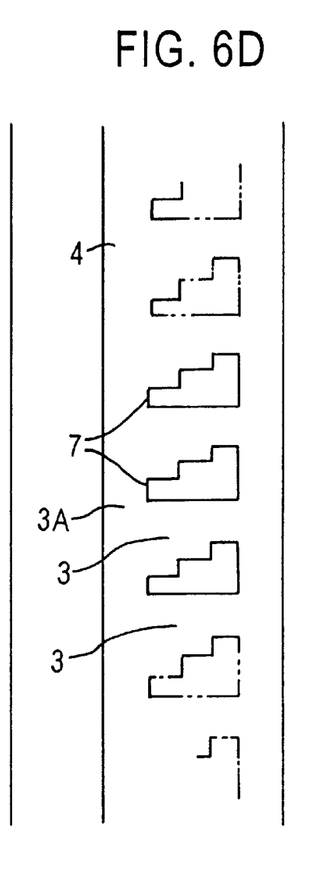

It is also possible to form the recesses in such a way that the circumferential width of the recesses in the direction of rotation changes stepwise along the rotation axis, as shown in FIG. 6D, so that the ratio between the slit portions 8A and the non-slit portions 8B (the slit ratio of the perforated separation line 8) can be adjusted stepwise.

Because of the construction as described above, the invention provides a very novel, perforated separation line forming apparatus which can adjust the ratio between the slit portions and the non-slit portions simply by moving or adjusting the receiving rotary body relative to the edged rotary body and thereby can adjust the slit ratio of the perforated separation line easily and without little additional cost.

According to another aspect of the invention, an excellent, perforated separation line forming apparatus is provided which can progressively adjust the slit ratio according to the relative displacement of the receiving rotary body with respect to the edged rotary body and can even realize a continuous adjustment.

According to still another aspect of the invention, a very excellent, filling and packaging machine is provided which can produce the effects and workings described above and can adjust the slit ratio of the perforated separation line as required according to the requirements of the user and according to a change made in the film material or the like.

INDUSTRIAL APPLICABILITY

Because the slit ratio can be adjusted easily in this way, a novel filling and packaging machine, such as the one according to the embodiment, can be provided which can adjust the slit ratio according to the requirements of the user and which can also change the slit ratio as required according to a change made in the film material or the like.

What is claimed is:

1. A perforated separation line forming apparatus characterized by:

an edged rotary body having a round slitting edge; and a receiving rotary body having a receiving circumferential surface that the round slitting edge engages;

wherein the edged rotary body and the receiving rotary body are arranged to clamp a perforated line forming position of a continuously fed transfer material therebetween;

wherein the receiving circumferential surface of the receiving rotary body is formed with non-slit portion forming recesses, which the round slitting edge of the edged rotary body cannot engage, at predetermined intervals in the direction of rotation, so that the perforated separation line formed at the perforated line forming position has slit portions and non-slit portions alternated successively;

wherein the receiving rotary body is movably adjustable relative to the edged rotary body in an axial direction; the non-slit portion forming recesses of the receiving rotary body are so shaped that a circumferential width of the recesses in the direction of rotation changes in an axial direction of the receiving rotary body; and as a result of the relative movement of the receiving rotary body in the axial direction, the circumferential width of the non-slit portion forming recesses in the direction of rotation varies so that a ratio between the slit portions and the non-slit potions is variably adjustable.

2. A perforated separation line forming apparatus according to claim 1, wherein the non-slit portion forming recesses of the receiving rotary body are so shaped that the circumferential width of the recesses in the direction of rotation progressively increases or decreases in an axial direction of the receiving rotary body, and as a result of the relative movement of the receiving rotary body in the axial direction, the circumferential width of the non-slit portion forming recesses in the direction of rotation varies so that a ratio between the slit portions and the non-slit portions is variably adjustable in a predetermined adjustment range.

3. In a filling and packaging machine which longitudinally and laterally seals a continuously fed film while at the same time filling a content into the film to produce a plurality of columns, parallelly arranged side by side, of package bags loaded with the content, each column having a number of package bags connected in series; a perforated separation line forming apparatus according to claim 1, wherein the edged rotary body and the receiving rotary body are arranged so that the perforated separation line can be formed in longitudinally sealed portions that constitute boundaries between the columns, parallelly arranged side by side, of the package bags loaded with the content.

* * * * *